US007717032B2

(12) United States Patent
Neto

(10) Patent No.: US 7,717,032 B2
(45) Date of Patent: May 18, 2010

(54) LINEAR ACTUATION DRIVE SYSTEM FOR MULTI-UNIT FRUIT JUICE EXTRACTION MACHINES

(76) Inventor: Carlos Mendes Neto, Rua Voluntarios de Patria 1766 - Apt. 101, CEP 14-808-320, Araraquara, SP (BR)

( * ) Notice: Subject to any disclaimer, the term of this patent is extended or adjusted under 35 U.S.C. 154(b) by 1502 days.

(21) Appl. No.: 11/052,578

(22) Filed: Feb. 7, 2005

(65) Prior Publication Data
US 2005/0199138 A1 Sep. 15, 2005

(30) Foreign Application Priority Data
Feb. 9, 2004 (BR) .................... 0400635

(51) Int. Cl.
B02C 15/00 (2006.01)
A47J 19/02 (2006.01)
B30B 9/30 (2006.01)
B30B 9/32 (2006.01)
B30B 9/02 (2006.01)

(52) U.S. Cl. ...................... 99/510; 100/98 R; 100/108; 100/213

(58) Field of Classification Search .................. 99/510, 99/501, 502, 503; 74/89.2; 100/98 R, 108, 100/213, 110, 126, 282
See application file for complete search history.

(56) References Cited
U.S. PATENT DOCUMENTS
1,514,094 A 11/1924 Noble
2,116,325 A 5/1938 Rogers
2,346,571 A 4/1944 Delay
2,420,679 A 5/1947 Pipkin
2,522,800 A 9/1950 Quiroz (Continued)

FOREIGN PATENT DOCUMENTS
EP 0442535 A1 8/1991

(Continued)

OTHER PUBLICATIONS
"Mechanisms, Linkages, and Mechanical Controls", 1965, McGraw-Hill, Inc., pp. 55 and 78.

(Continued)

Primary Examiner—Tu B Hoang
Assistant Examiner—Lindsey C Teaters
(74) Attorney, Agent, or Firm—Beusse Wolter Sanks Mora & Maire, P.A.; Joseph Fischer; David G. Maire

(57) ABSTRACT

A rotary-to-reciprocating linear drive conversion device is linked to drive moveable elements of a multi-unit fruit juice extraction machine. At least two co-rotating members drive a reciprocating transverse member by means of respective protruding force-transfer posts of the co-rotating members rotating while disposed to slidingly engage in the groove, so that the rotation of the co-rotating members results in reciprocal movement of the transverse member, and of elements of the multi-unit fruit extraction machine linked thereto.

The elements of the multi-unit fruit extraction machine include opposing sets of a plurality of matched peeler cups, forming matched pairs of opposing peeler cups, each peeler cup comprising a plurality of outwardly extending blades cooperatively intermeshing with a corresponding plurality of outwardly extending blades of an opposing peeler cup of the matched pair, one of said cups additionally comprising a filter device.

2 Claims, 9 Drawing Sheets

U.S. PATENT DOCUMENTS

| | | | |
|---|---|---|---|
| 2,534,554 A | 12/1950 | Kahre | |
| 2,540,345 A | 2/1951 | Pipkin | |
| 2,713,434 A | 7/1955 | Belk | |
| 2,723,618 A | 11/1955 | Matthews | |
| 2,748,693 A | 6/1956 | Drain et al. | |
| 2,856,846 A | 10/1958 | Belk | |
| 3,053,170 A | 9/1962 | Cook | |
| 3,086,455 A | 4/1963 | Belk | |
| 3,162,114 A | 12/1964 | Quiroz | |
| 3,236,175 A | 2/1966 | Belk | |
| 3,269,301 A | 8/1966 | Krause | |
| 3,682,092 A | 8/1972 | Breton et al. | |
| 3,866,528 A | 2/1975 | Montagroni | |
| 4,154,163 A | 5/1979 | Niemann | |
| 4,195,581 A * | 4/1980 | Ohara | 112/103 |
| 4,300,449 A | 11/1981 | Segredo | |
| 4,309,943 A * | 1/1982 | Larsen et al. | 99/509 |
| 4,376,409 A | 3/1983 | Belk | |
| 4,391,185 A | 7/1983 | Stanley | |
| 4,459,906 A | 7/1984 | Cound et al. | |
| 4,700,620 A | 10/1987 | Cross | |
| 4,905,586 A | 3/1990 | Anderson et al. | |
| 4,917,007 A | 4/1990 | Nelson | |
| 4,922,813 A | 5/1990 | Compri | |
| 4,922,814 A | 5/1990 | Anderson et al. | |
| 4,951,563 A | 8/1990 | Warren et al. | |
| 4,961,374 A | 10/1990 | Lee | |
| 5,035,174 A | 7/1991 | Seal, Jr. | |
| 5,070,778 A | 12/1991 | Cross et al. | |
| 5,097,757 A | 3/1992 | Antonio | |
| 5,156,872 A | 10/1992 | Lee | |
| 5,170,700 A | 12/1992 | Anderson et al. | |
| 5,182,984 A | 2/1993 | Wagner | |
| 5,199,348 A | 4/1993 | Cimenti | |
| 5,249,514 A | 10/1993 | Otto et al. | |
| 5,249,515 A * | 10/1993 | Bachmann | 99/504 |
| 5,331,887 A | 7/1994 | Beck | |
| 5,339,729 A | 8/1994 | Anderson | |
| 5,381,730 A | 1/1995 | Kim | |
| 5,396,836 A | 3/1995 | Kim | |
| 5,483,870 A | 1/1996 | Anderson et al. | |
| 5,655,441 A | 8/1997 | Mendes | |
| 5,720,218 A | 2/1998 | Mendes | |
| 5,720,219 A | 2/1998 | Mendes | |
| 5,802,964 A | 9/1998 | Mendes | |
| 6,161,475 A | 12/2000 | Coppelletti | |

FOREIGN PATENT DOCUMENTS

| | | |
|---|---|---|
| EP | 0757896 A1 | 2/1997 |
| GB | A-7 539 88 | 8/1956 |
| GB | 2 116 021 A | 9/1983 |

OTHER PUBLICATIONS

Deane Lent, "Analysis and Design of Mechanisms", pp. 76, 77, 78, 320, 321, 386 and 387.

* cited by examiner

LINEAR ACTUATION DRIVE SYSTEM FOR MULTI-UNIT FRUIT JUICE EXTRACTION MACHINES

BACKGROUND OF THE INVENTION

The present patent of invention refers to "A LINEAR ACTUATION DRIVE SYSTEM FOR MULTI-UNIT FRUIT JUICE EXTRACTION MACHINES. As the nomenclature indicates, embodiments of the present invention have been developed to be used in equipment for extraction of juice from citrus fruit such as orange, tangelo, grapefruit, lemon, lime, tangerine, mekan, ponkan, and other non-citrus fruit of round and semi-spherical shapes. Also, in other various embodiments in other types of machines, an actuation system of the present invention is utilized to provide a reciprocating linear force obtained from a rotary motion sub-assembly. Important characteristics of the systems, apparatuses and methods of the present invention include the fact that conjugated circular (i.e., rotary) movement is converted into linear motion. Embodiments of the present invention are substantially compact, durable, simple, generate low noise, work smoothly without impact and have high efficiency, and in so operating reduce installed power needs and consequentially energy demands.

THE STATE OF THE ART

The state of the art is known by various previous patents by the same inventor, including Brazilian patents PI9502244-9, PI9503109-0, PI0005957, PI0303804-1, MU7800719-4, DI5501053-9, MU7502784-4, as well as also including American patents, such as U.S. Pat. No. 5,655,441, U.S. Pat. No. 5,720,218, U.S. Pat. No. 5,720,219 and U.S. Pat. No. 5,802,964, that revolutionized the market with the introduction of a method of juice extraction that reduces or eliminates the traditional bitter taste of citrus juices, by reducing or eliminating the contact of the peel oil with the extracted juice. Also, U.S. patent application Ser. No. 10/932,613, filed Sep. 2, 2004, by the same inventor, discloses aspects of commercial juice extraction devices and methods that have a number of opposing peeler cups operating in a synchronized manner. This disclosure is incorporated by reference specifically for the teachings related to the arrangement and operation of components, and arrangements of components, that are common to that disclosure and the present application, and, alternatively, that may be employed in embodiments of the present invention. More generally, all references, patents, patent applications, patent publications, technical publications, scientific publications, and other references referenced herein are hereby incorporated by reference in this application in order to more fully describe the state of the art to which the present invention pertains, and for the applications of the inventor for which priority is claimed, in order to describe features, variations, and embodiments of the present invention.

Notwithstanding the improvements in the above-referenced patents and applications, several problems in the commercial fruit juicing industry remained unsolved. First, during replacement of existing juicing equipment with juicing machinery incorporated the horizontal juicing technology of the present applicant, there is a problem of how to maximize the juicing capacity on a per square foot of floor space below the existing fruit sorting and delivery systems. Associated with this is a desire, based on economics and capital investment, to reduce the extent of modifications to such existing fruit sorting and delivery systems. Second, there are associated problems inherent in new equipment, first in the high capital cost when there is redundancy in basic structures, and second in the operational and output-lowering downtime when one key component, such as a power drive, in a larger multi-unit juicing module, fails and requires that the entire multi-unit module is taken off the production line. As disclosed herein, the present invention solves these problems by providing reliable apparatuses and methods that utilize an innovative drive system that converts rotary motion of co-rotating members, each having a post, to a reciprocating longitudinal motion of a driven transverse member, wherein each of posts transfers force to a slot (or a groove) in the transverse member, the slot (or groove) disposed transversely to an axis of reciprocating motion of the transverse member, so as to provide a desired reciprocating motion for a fruit juice extraction machine having a number of juicing units.

The equipment based on the above-mentioned patents based its improvements in the use of a process of peeling the fruit before the extraction of the juice is completed, by use of a fixed peeler cup (concave and semi-hemispherical) and, by the action of the pressing of the fruit by another identical movable peeler cup, in which in the joint operation of closing, acts on the peel by cutting longitudinal peel strips. During and immediately after this process, almost instantaneously, the internal portions of the fruit containing the pulp and juice, enter in the juice collector, which has a lower end that makes it possible, by the action of gravity, to flow to a tubular juice collector. The core of the fruit now drained of its juice and in its dried state is then expelled by a plunger, returning in the direction of the opening of the filter, in a way that it is completely expelled, being forced to vertically fall, by action of gravity, into and between the peeler cups, and finally, falling into peel and core transport devices.

Conventional mechanisms utilize a technology in which the advance and return of moveable parts is obtained, in the majority of cases, by means of linear actuators like hydraulic or pneumatic pistons, or movements of crankshafts, independently of the geometric configurations between peeler cups.

Other advances were introduced in this fruit juicing system and were object of other patents and patent applications as cited earlier, nevertheless, these applications always incorporated the original scope of the basic fruit juicing invention. The present invention, in embodiments described herein and as claimed below, utilizes an innovative drive mechanism for multi-unit fruit juice extraction machines to drive embodiments of the above-referenced fruit juice extraction invention. However, the drive mechanism of the present invention may also be used for drive and force conversion applications that are independent of such fruit juice extraction machines, and, in other uses, that are unrelated to all types of fruit juice extraction machines.

The drive mechanism of the present invention may be viewed to have as one of its predecessors a drive mechanism known as a "Scotch Yoke." A Scotch Yoke device, as is known to those skilled in the art of mechanical drive mechanisms, converts rotary movement from a single driving wheel to reciprocating movement of a driven shaft. This conversion of movement is achieved through a protruding pin or bearing from the wheel engaging a slot (or a groove) disposed transversely on the shaft, so that as the pin rotates it slides within the slot (or groove) and pushes the shaft forward and then backward, to create a reciprocating linear movement. Typically there are bushings or other forms of bracing to each side of the slot (or groove) to stabilize the shaft in order to reduce the effect of sideways motion from the pin moving in the slot (or groove).

The present invention advances the art with a drive mechanism comprising two or more co-rotating driving members that, in various embodiments, provide for translation of rotary to linear reciprocating motion while providing reduced force imbalances due to sideways force vectors.

SUMMARY OF THE INVENTION

The present invention maintains the primary characteristics of the original patents, nevertheless, in embodiments such as disclosed herein it provides a linear actuation of the moveable peeler cup(s), and plunger(s), through the transformation of circular motion, such as, for example (not to be limiting) generated by a gearmotor assembly, into linear motion, thanks to a transmission assembly formed by pulleys, that through a belt and/or chain drive, transmit force to gears that are placed on top of the pulleys, attached to cam followers installed at the perimeter of said gears, which in turn are inserted into a groove of a transverse grooved member to which are attached actuation rods, linked to the aforementioned peeler cups and plungers, being that the use of the drive conversion mechanism of the present invention provides for an improvement in the cost/benefit relationship of any such equipment that may come to utilize it, due to the fact that this system is substantially compact, durable, simple, generates low noise, works smoothly without impacts and has nigh efficiency, and in so doing reduces installed power needs and consequentially energy demands.

Due to its characteristics, this actuation system applied to citrus juice extraction machines provides, beyond the advantages above mentioned, the following additional benefits: significant economy of space, low degree of complexity as well as energy consumption and operating time, lower production and maintenance costs, as well as less time required for cleaning, lower labor costs, reducing the number of parts, etc., in a manner as to obtain simplicity and efficiency.

By means of the use of this innovative concept, one can achieve great simplicity and compactness in the construction and installation, increasing reliability and durability on the equipment in which it is utilized, and beyond these described advantages, also facilitates its compaction and thus adding less total cost to the equipment, when compared to other existing systems, even as compared to previous systems patented by this same inventor.

BRIEF DESCRIPTION OF DRAWINGS

The invention is described in the following attached figures, in which details will be illustrated, including.

DETAILED DESCRIPTION OF EMBODIMENTS OF THE INVENTION

Figure 1:
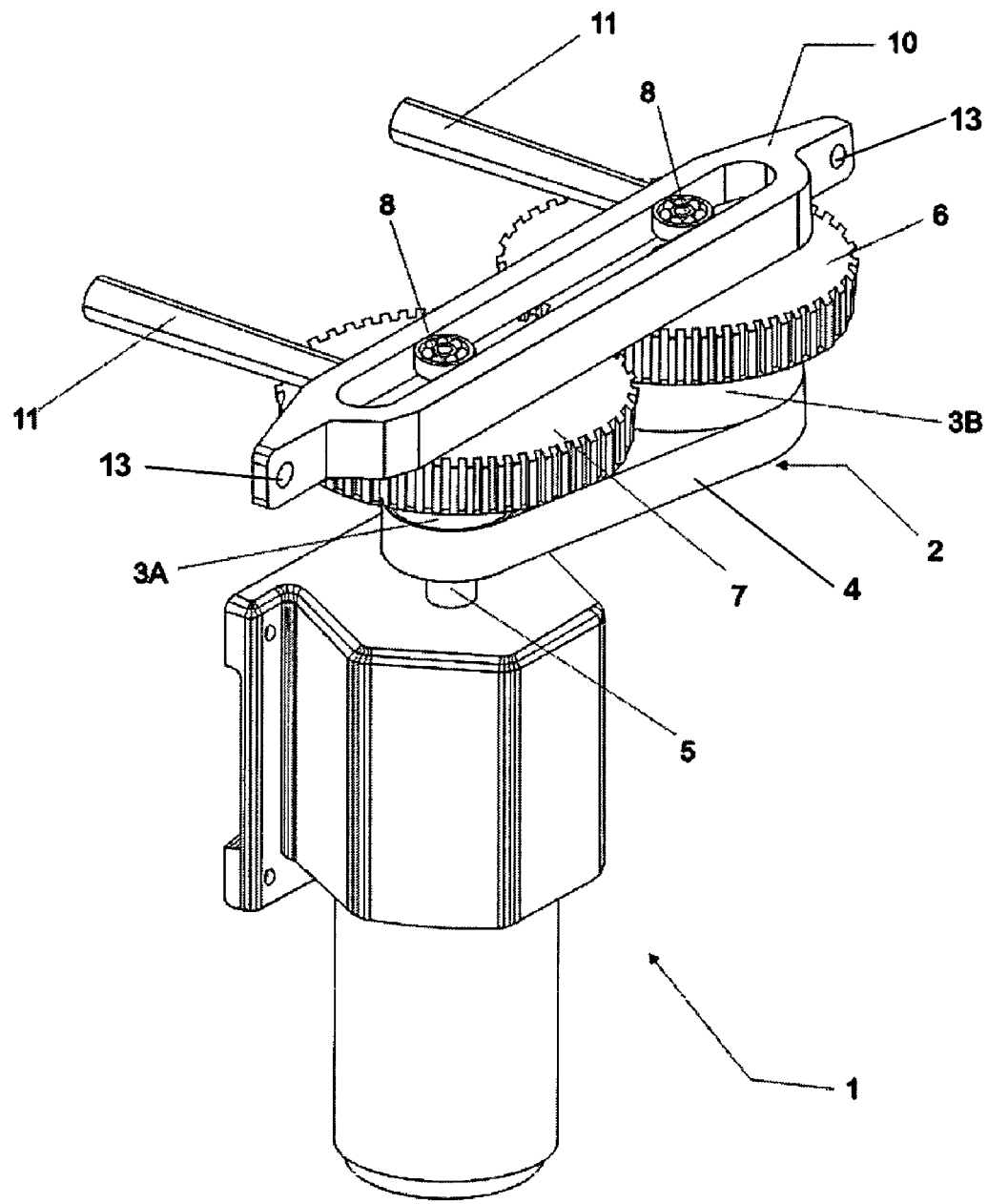
FIG. 1: A perspective view of one embodiment of the actuation system of the present invention, showing the gearmotor, the transmission assembly comprised of preferentially pulleys and belts, gears, cam followers, the transverse actuating bar and attached actuation rods that transmit motion to the moveable parts.
Figure 2:
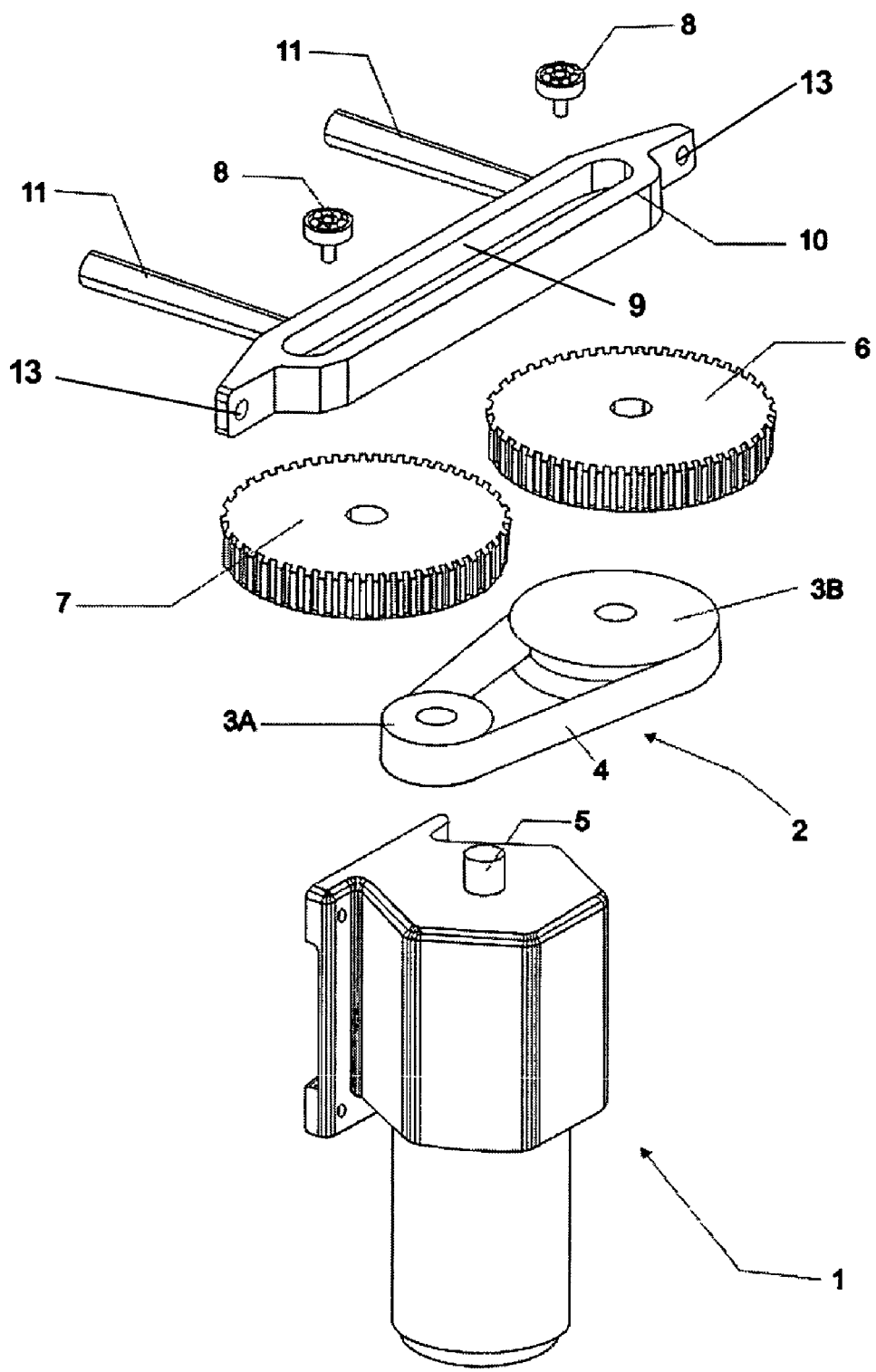
FIG. 2: An exploded perspective view of the actuation system embodiment of FIG. 1.
Figure 3:
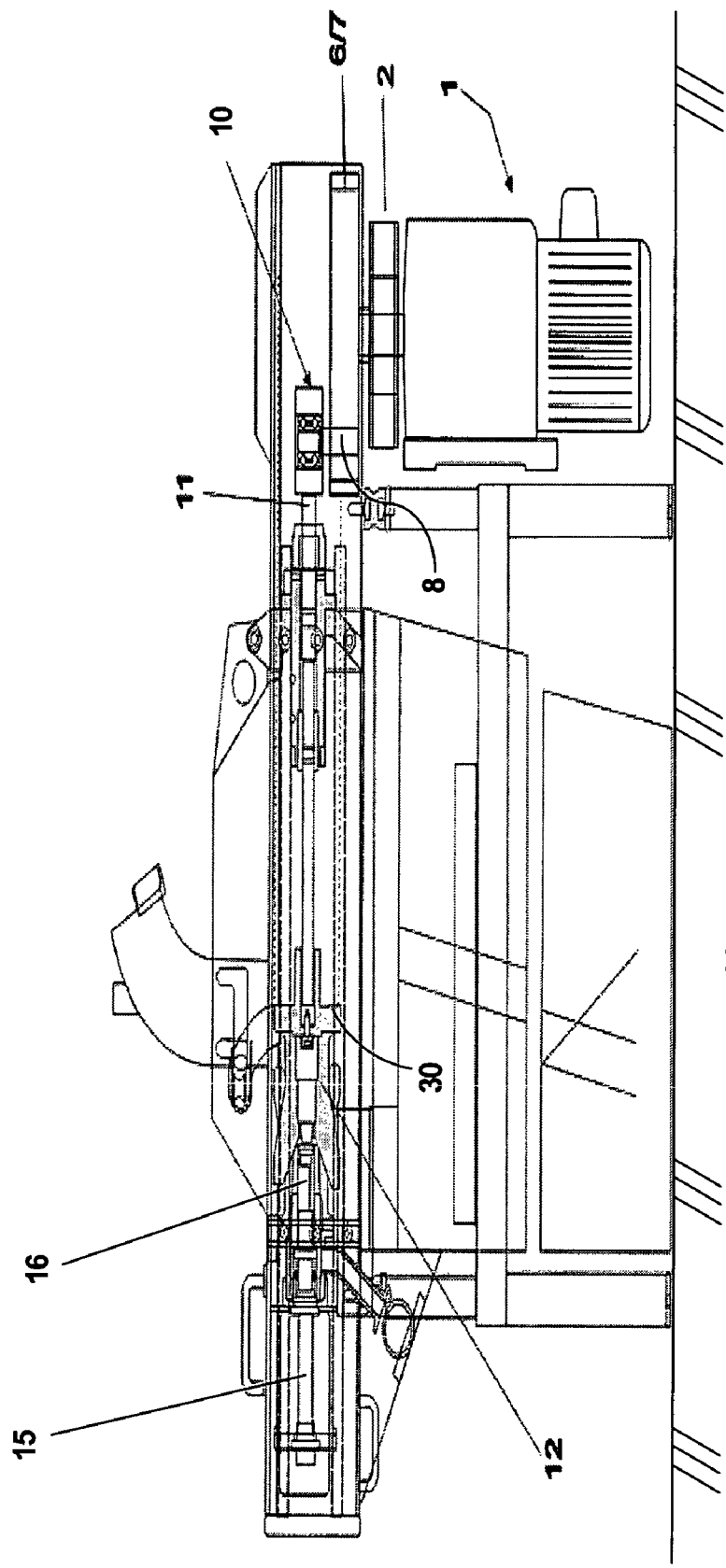
FIG. 3: A longitudinal cross section view of the actuation system embodiment of FIG. 1.
Figure 4:
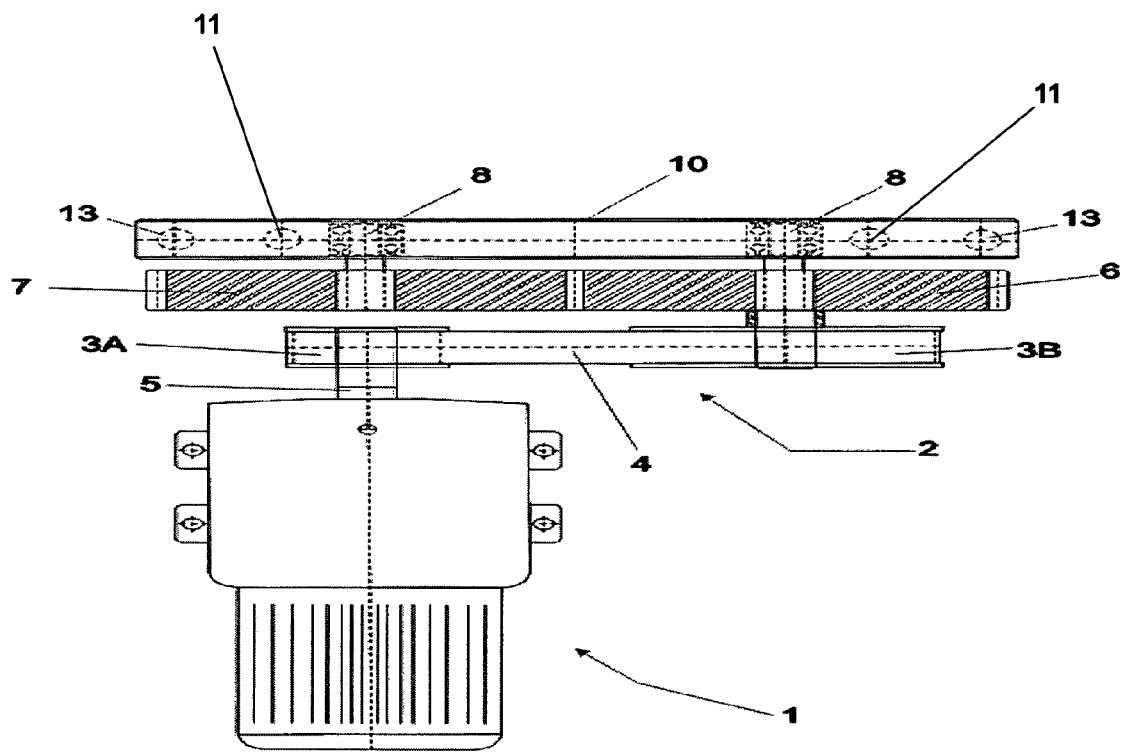
FIG. 4: A rear view of the actuation system embodiment of FIG. 1.
Figure 5:
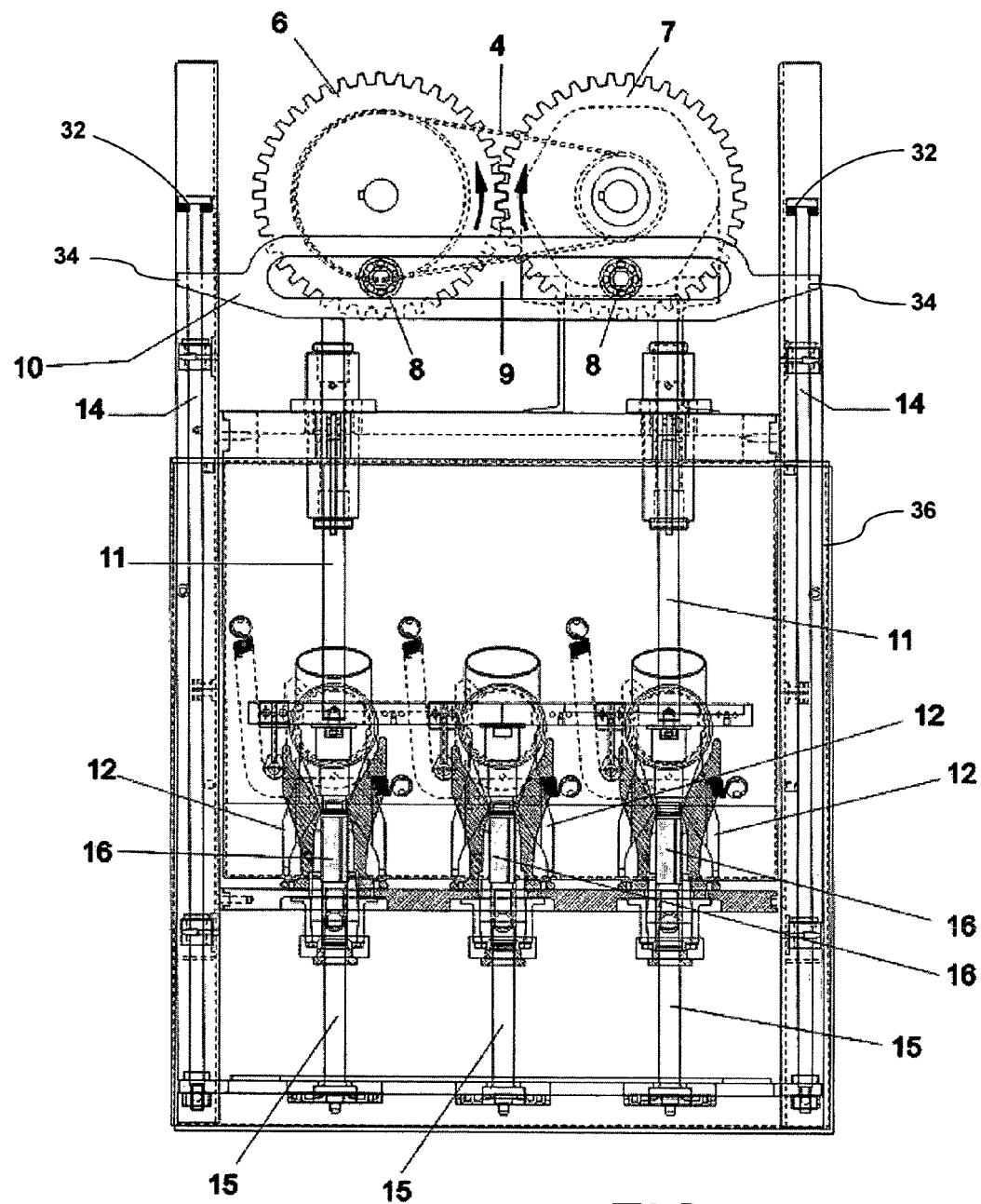
FIG. 5: A cross sectional top view of the embodiment of FIG. 1 of the present invention showing the peeler cups in the totally closed position.
Figure 6:
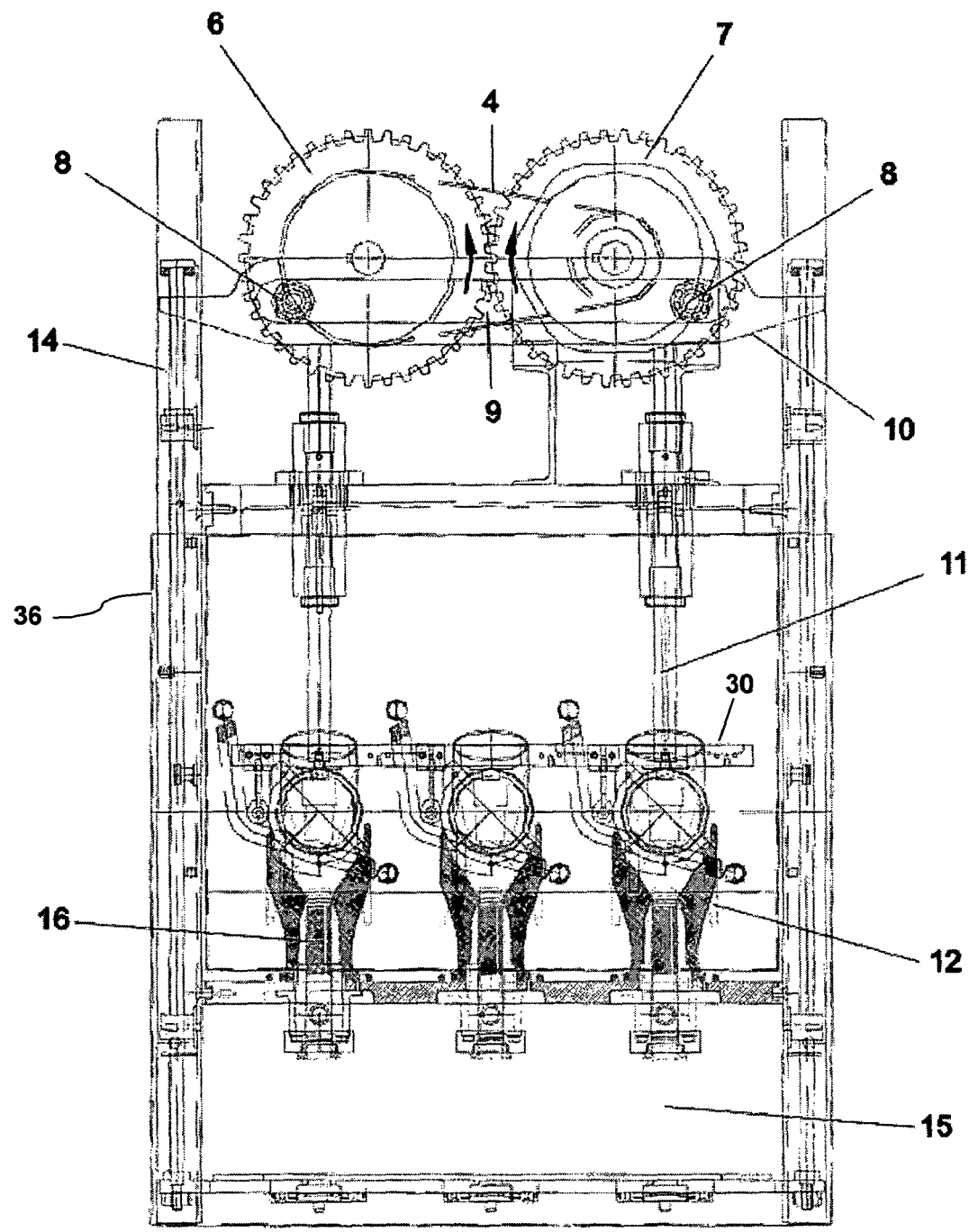
FIG. 6: A cross sectional top view of the embodiment of FIG. 1 of the present invention showing the peeler cups in an intermediate position.
Figure 7:
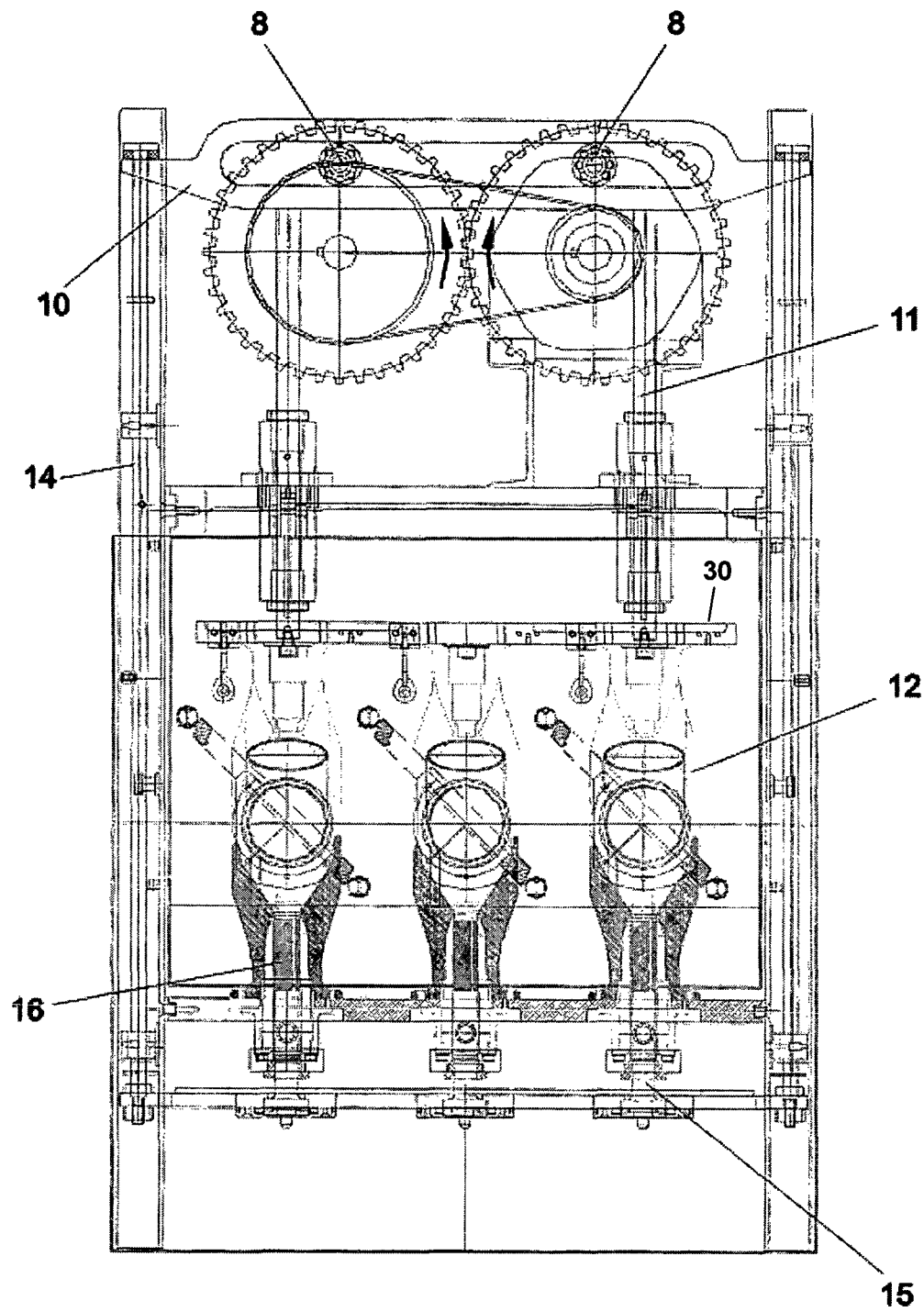
FIG. 7: A cross sectional top view of the embodiment of FIG. 1 of the present invention showing the peeler cups in the totally open position.

The present patent "A LINEAR ACTUATION DRIVE SYSTEM FOR MULTI-UNIT FRUIT JUICE EXTRACTION MACHINES, object of this patent application, may be described by reference to an embodiment in the form of a system, as depicted in FIGS. 1-4, comprising a motor drive type of power source here represented by a gearmotor assembly (1) that drives a transmission assembly (2) comprised of two pulleys (3A, a drive pulley, and 3B, a driven pulley), and a belt (4), which can be a chain or other transmission element, being that the drive pulley (3A) is solidly attached to the end of the output shaft (5) of gearmotor (1), of smaller diameter than the driven pulley (3B), which is slaved to the first, and solidly affixed to a drive gear (6), positioned on top of slaved, driven pulley (3B), by which in its geared action drives a second, driven gear (7), in a manner as to synchronize the rotation of these two gears (6 and 7). The synchronized rotation of the two gears (6) and (7) causes the coordinated dislocation of two drive cam followers (8), each said drive cam follower being positioned proximate to the respective perimeter of one of the two gears (6) and (7), in a manner to permit their movement inside a groove (9) disposed in a transverse actuation bar (10). The transverse actuation bar (10) is connected to two drive rods (11), such as by, as shown here, direct attachment to the transverse actuation bar (10). The two drive rods (11) are linked to the moveable parts of the juice extractor equipment, here being attached to drive a plurality of moveable peeler cups (12) that are affixed to a transverse plate (30) (viewable in FIGS. 3 and 5-7), so as to generate the movement of linear advance and return.

In the embodiment depicted in FIGS. 1-7, the transverse actuation bar (10) also has guide orifices (13) at its lateral extremities, linked to two lateral rods (14) so that the transverse actuation bar (10) slides along and is stabilized during its reciprocating motion by sliding along the two lateral rods (14). This is best depicted by comparison of FIGS. 5-7. The sliding engagement of the transverse actuation bar (10) with the two lateral rods (14) via the guide orifices (13) not only reduces vectorial forces due to the dislocation of the said bar (10), but cause the movement of plungers (15) in the direction to expel the cores of fruits from inside the filtering elements (16).

In so being, the circular motion generated by the gearmotor (1) is directly transmitted to the drive pulley (3A), which is solidly attached to the end of the output shaft (5) of gearmotor (1), which drives the belt (4), which in turn drives the slaved pulley (3B), thus forming a transmission assembly (2), which not only increases the force of the gearmotor (1), being that this will function as a reduction due to the differences in diameters between the pulleys (3A and 3B), giving it also impact absorption capacity due to the linking of said pulleys (3A and 3B), since this linking is done preferentially by means of a belt (4). In sequence, the slaved pulley (3B), solidly attached to drive gear (6), causes the gear to turn, and by the meshing of its teeth with a second gear (7), causes synchronized circular motion of the same speed, since both have the same diameter and number of teeth. In so doing, the drive cam followers (8) attached to the two gears (6 and 7), strategically placed, with the circular motion of said gears (6 and 7), describe a longitudinal movement along the groove (9) of the transverse actuation bar (10), in a manner as to force said bar into a linear motion of advance and return, orthogonally to the linear motion of the drive cam followers (8), the movement of which is directly proportional to the distal distance in relation to the axes of gears (6 and 7), in a manner that this movement is transmitted to the moveable parts of the equipment, which are affixed, by means of drive rods (11) attached to the transverse actuation bar (10), as well as the lateral rods (14), linked to plungers (15). While not shown in FIGS. 1-7, a spring is connected to each of the lateral rods (14) so as to return the plungers (15) to their outmost position (relative to their respective filtering elements (16)) when the force-receiving ends (32) of the lateral rods (14) are no longer being moved by the lateral ends (34) of the transverse actuation bar (10). The return may be effectuated by one or more springs that are compressed during the movement of the respective plungers into the respective filtering devices, and/ or by one or more springs that are tensioned during the movement of the respective plungers into the respective filtering devices. Other means of return, other than a spring, may alternatively be employed for this purpose.

As an example of operation of the juice extraction utilized in the present invention, in one embodiment of this invention a juice extraction machine is provided comprised of three matched pairs of conical peeler cups, being three fixed and three movable, where for each fixed peeler cup there is a corresponding movable peeler cup. All three fixed peeler cups are affixed to the basic structure (i.e., chassis) of the machine and the three movable peeler cups are affixed to a movable support which in turn is driven by a drive mechanism as described herein, that directs, in iterative cycles, the three concave movable peeler cups to advance toward and return from the three fixed peeler cups. At a part of each cycle when the three sets of matched peeler cups are in an open position, a respective fruit falls into respective radially slit concave chambers formed by the joining of the concave fixed peeler cups with each of their respective movable peeler cups (each fixed and moveable cup comprising a plurality of outwardly extending blades emanating from a central structure, with some elongated blades extending sufficiently to hold the respective fruit in the respective chamber). Then the movable peeler cups close upon the respective fruit, now inside the chambers, cutting the peel of the fruit to initiate the peeling process, and continuing on the cycle of juice production by the introduction of the internal fruit core and pulp, containing the juice, into three respective filtering devices (respectively positioned centrally in each of the fixed peeler cups). Pressure from the continued closing of the peeler cups forces juice from each fruit, being compressed, through the respective filtering device, and then to collection and storage components.

On the return of this assembly of three movable peeler cups, longitudinal rods, slaved to this return motion, actuate at their opposite end a first transverse member, which in turn is affixed at its extremities, to two parallel rods, which in turn are fixed at their extremities to a second transverse member, on the opposite end, which in turn is affixed to three plungers, respectively positioned inside their respective fixed peeler cups, that slide internally in the cylindrical filtering device. Therefore, the return of the assembly containing the three movable peeler cups, because of this constructive configuration, simultaneously and collectively, the respective three plungers that operate inside their respective cylindrical filtering devices, in a manner such that, at the end of each cycle, the plungers advance in the direction of going beyond the ends of the cylindrical filtering devices through which the fruit entered, thus resulting in the now compressed fruit cores, extracted of most juice, being expelled from the inside, to the outside of the filtering devices. The expelled compressed fruit falls and passes through the blades of the peeler cups, which are now in their maximum open position. In this manner concluding the extractive cycle, the equipment is ready for the initiation of the next cycle of extraction and prepared for the next fruit to be processed inside the respective pairs of fixed and movable matched peeler cups.

It is noted that the blades of the matched fixed and movable peeler cups cooperatively intermesh as the movable peeler cup advances to the fixed peeler cup during the extraction stroke of the juicing cycle. This cooperative intermeshing provides for the peeling of the fruit. It is further noted that in some embodiments, given the progressive relative movement of the matched peeler cups toward one another while their intermeshing blades initiate and continue contact with the peel of the fruit, the peeling activity of the blades is about twenty percent completed when sufficient fruit is compressed into the filtering device to result in the beginning of the juicing of the fruit. Thereafter, peeling and juicing occur concurrently, and thereafter, toward the latter 20-30 percent of the juicing period for that fruit, the peeling has ceased and only the juicing occurs. Thus, in such embodiments, the peeling starts before the juicing starts, then both peeling and juicing occur simultaneously, and toward the end of the compression part of the juice extraction cycle, only juicing occurs.

As may be observed in the FIGS. 1-7, and as is described in patents and applications of the present inventor that are incorporated herein, components of the present invention are affixed at various points to a chassis (36) to provide structural support. The chassis (36) typically is made of iron or steel, and is positioned at a desired location relative to the fruit distribution system, on the floor (38) of a fruit juicing facility. As for other mechanical equipment, appropriate attachment of moving and non-moving components to the chassis (36), and of the chassis (36) to the floor (38), stabilizes the equipment and dampens vibration.

Thusly, is generated, from the circular motion of the motor drive element, a linear movement of the drive rods (11) and the lateral rods (14), necessary for the actuation of the equipment in question, or any other machine in which this may be applied to.

While the embodiment described above, and depicted in FIGS. 1-7 presents one possible arrangement of elements of the present invention, this is not meant to be limiting. More generally, the gears (6) and (7) of the above-described embodiment are only one example of two co-rotating members that are used in the present invention. For example, without being limiting, a co-rotating member may be a wheel, disc, a solid in the shape of an octagon (or other polygon of even or uneven side lengths), or an ellipse (such as a cam-shaped body). Each co-rotating member has a first and a second surface (i.e., the top and the bottom surfaces of gears (6) and (7)), a perimeter (i.e., an outer edge), an axis about which it rotates, and a protruding object defined herein as a "force-transfer post." A force-transfer post may extend from any part of the co-rotating member, such as from one of the first or second surfaces of a co-rotating member, and protrudes sufficiently to engage and drive a transverse grooved member. In FIGS. 1-7, the drive cam followers (8) provide one example of force-+transfer posts, and the transverse actuation bar (10) provides one example of a transverse grooved member.

Also, a transverse grooved member may be connected directly or indirectly to a first set of peeler cups, wherein this first set of peeler cups and a second set of peeler cups are matched so the respective blades of the respective opposing peeler cups intermesh, and engage in a back and forth, reciprocating motion in relation to one another, wherein the driving force for this motion is transferred through the transverse grooved member. For example, not to be limiting, the first set of peeler cups may be moveable, the second set of peeler cups may be fixed, such as to one end of a chassis, and the transverse grooved member may be directly attached to each peeler cup of the first set of peeler cups. In such example, the transverse grooved member (and/or other components, such as the force-transfer posts) would need to have a geometry so that the co-rotating members would not hit the co-rotating members during rotation when the force-transfer posts are toward or at their extreme position away from these peeler cups.

In another example, such as depicted in FIGS. 1-7 above, the transverse grooved member is connected to the first set of peeler cups via two drive rods (such as drive rods (11) in FIGS. 1-7) that in turn connect to a first member to which are affixed the first set of peeler cups. It is noted that two drive rods, while shown in the above-described embodiment, is not meant to be limiting. One drive rod, or a number of drive rods in excess of two, may alternatively be utilized. Also, the number of cups in a set of matched opposing peeler cups is not meant to be limited to three. For example, a set of five or six peeler cups may be assembled on a first member that is driven from and connect to the transverse grooved member by two rods, or by three rods.

It is noted, however, that in some embodiments, separate power drives and connecting linkages independently operate the movement of peeler cups and plungers. In such embodiments, sensors, feedback loops, and the like may be employed to coordinate the timing of the movements of respective components to ensure a proper juicing cycle.

Embodiments such as the embodiment depicted in FIGS. 1-7, which utilize as co-rotating members intermeshing gears (or other synchronized rotating members) that rotate in opposite directions (i.e., counter-rotating gears), have been found to allow substantially greater speeds of operation than other approaches to drive conversion (such as, for example, not to be limiting, a Scotch Yoke). Such embodiments provide a compact mechanism for conversion of rotary movement to reciprocating linear movement without the inherent force imbalances of Scotch Yokes and simple cranks, nor the number of parts subject to wear and vibration in various straight-line generators. Particularly with regard to the use of synchronous equally sized and teethed counter-rotating intermeshing gears converting rotary motion to reciprocal motion for a multi-unit juice extracting device (such as depicted in FIGS. 1-7), it has been demonstrated that this approach has allowed the juice extraction to proceed at higher speeds than can be attained by other power conversion forms. Thus, having identified a problem of providing reliable linear reciprocating force to multi-unit commercial juicing devices, the inventor has solved this problem with the development of this and other embodiments that are capable of driving such multi-unit juicing devices at relatively high speeds as disclosed herein.

For example, a small, single unit juice extraction device (such as described and depicted in U.S. Pat. Nos. 5,655,441, 5,720,218, 5,720,219 and 5,802,964) may operate at a production rate of about 22-25 fruits squeezed per minute. There is some force imbalance using a simple crank drive mechanism, but this is not problematic at such speeds. However, this speed range is not considered commercially viable for large-scale commercial juicing, and it has been determined that a simple crank does not provide smooth, reliable operation at substantially higher speeds. In contrast, using counter-rotating intermeshing gears to convert rotary motion to reciprocal motion for a multi-unit juice extracting device (e.g., with a plurality of pairs of opposing matched peeler cups), higher production rates are attainable. For example, in some embodiments, the process of juicing citrus fruit using such drive mechanism having counter-rotating gears squeezes fruit at a rate of about 30 fruits per minute per pair of opposing matched peeler cups. In other embodiments of the method of fruit juicing, the production rate using such drive mechanism having counter-rotating gears is about 45 fruits per minute per pair of opposing matched peeler cups. In yet other embodiments of the method of fruit juicing, the production rate using such drive mechanism having counter-rotating gears is at least about 60 fruits per minute per pair of opposing matched peeler cups. In some of such latter embodiments, the method of fruit juicing proceeds at between about 60 and about 120 fruits per minute per pair of opposing matched peeler cups. It is appreciated that such rates and rate ranges may alternatively be expressed as cycles per minute, instead of fruits per minute per pair of opposing peeler cups.

For example, and not to be limiting, a method of iteratively extracting juice from articles of fruit using a multi-head fruit extraction device may be described as follows:

assembling said multi-head fruit extraction device, which comprises
   a. a driven transverse grooved member having a groove extending transversely to an axis of movement, connected to drive at least one of two opposing sets of matched peeler cups in a back and forth reciprocating action;
   b. a first co-rotating member comprising a first protruding force-transfer post disposed to slidingly engage in the groove;
   c. a second co-rotating member comprising a second protruding force-transfer post disposed to slidingly engage in the groove, said second co-rotating member rotating in an opposite direction of the first co-rotating member;
   d. a power source connected to drive in a rotating motion at least one of the first co-rotating member and the second co-rotating member;
   e. said two opposing sets of peeler cups that move back and forth relative to each other along said axis, comprising a plurality of pairs of peeler cups, each respective pair matched so their respective blades intermesh, one respective peeler cup of each said matched pair comprising a filter device disposed therein, adapted to receive compressed fruit and pass juice therethrough; and
   f. a set of plungers, each said plunger disposed to move through a respective filter device to push the compressed fruit from said filter device;
activating said power source to cause said reciprocating action at a specified speed;
providing articles of fruit into respective chambers formed by said respective matched pairs of peeler cups, so that one respective article of fruit enters each respective chamber during a respective cycle of fruit extraction; and
collecting juice squeezed through each respective filter device from said articles of fruit; wherein the reciprocating action is sufficient to compress each said article of fruit to squeeze juice through said respective filter device, and said specified speed exceeds about 30 cycles per minute.

Alternatively, the method may be operated wherein said specified speed exceeds about 45 cycles per minute, wherein said specified speed exceeds about 60 cycles per minute, or wherein said specified speed is between about 60 and about 120 cycles per minute.

It is appreciated that the above, detailed method includes the more abbreviated, operational method comprising the steps of activating a power source, providing articles of fruit, and collecting juice squeezed while using a juice extraction device such as the one so described. It is further appreciated that the methods of the present invention may alternatively be described in other manners, such as in the claims appended below.

It is noted that the protruding force-transfer posts may be cam followers having two ends, one end attached to the respective co-rotating member, the other end having bearings (such as but not limited to roller bearings) the outer surface of which slidably fits into the groove, so that the bearing reduces friction as the cam follower travels laterally within the groove. Other designs of protruding force-transfer posts may be utilized, such as those having bushings, low-friction surfaces that slidably engage the groove, and the like.

As to the physical and force-transfer relationship between the force-transfer posts of the co-rotating members and the transverse member, several variations in configurations are now discussed in order to appreciate the scope of the present invention in this regard. First, in order to obtain a desired balanced force on the transverse member, to provide a balanced linear reciprocating motion, the force-transfer posts are aligned to synchronously contact the transverse member. That is, each such post is aligned with the other posts along a single moving line (transverse to the axis of linear reciprocating motion of the transverse member) so that the force they exert against the transverse member is substantially uniform. That is, in such embodiments, there is a coordinated synchronous rotating motion of the co-rotating members such that their respective force-transfer posts exert force substantially uniformly against the transverse member.

Thus, in such embodiments, when a groove exists in the transverse member, the force-transfer posts engage the groove in a synchronous manner. This occurs when the co-rotating members are synchronous. Additionally, when a pair (or other even multiple) of co-rotating members are counter-rotating with respect to one another (or of each adjacent member of a respective pair), and operate at described above synchronously as to the alignment and movement of the force-transfer posts, there is an increased performance that is related to consequent decreased force imbalance. This is based on the counter-rotation equalizing the forces being applied to the transverse member, since the forces are being applied equidistant from a midpoint between the centerpoints of rotation, even as these forces from the force-transfer posts are moving toward and away, laterally, from that midpoint.

It also is appreciated that, in some embodiments, there may be more than one groove in a transverse grooved member. For example, not to be limiting, two pairs of synchronized, counter-rotating members (such as powered by a single source by geared transmission) may engage to drive a laterally wide transverse grooved member that has a groove to receive the force-transfer posts of one such pair at one end, and a second groove at the other end to receive the force-transfer posts of the other such pair. Such a transverse grooved member may drive a relatively larger number of moveable peeler cups, for instance 6-12 moveable peeler cups.

Embodiments of the method may utilize a multi-head fruit extraction device that comprises a driven transverse member that additionally comprises two guide orifices that slidingly engage respective lateral rods. Such arrangement dampens vibration from non-reciprocating motion force vectors, and may additionally be connected to the set of plungers, to drive each respective plunger in its respective movement through a respective filter device to push compressed fruit from said filter device. Whether the movement of the plungers is provided by the same power source that drives the reciprocating motion of the opposing sets of peeler cups, or by a different source and drive linkage, it is noted that the distance of travel of the plungers need not be the same distance of travel of the reciprocating motion of the opposing sets of peeler cups. For example, in one embodiment, a moveable set of peeler cups moves back and forth (i.e., away and toward) a total distance of about 200 millimeters ("mm"), whereas the plungers of such embodiment move a total distance, into and back out of the respective filter devices, of about 140 mm. This example is not meant to be limiting, as embodiments may be designed and fabricated in which the total distance moved by the plungers is equivalent to, or is greater than, the total distance of relative movement between the opposing sets of peeler cups.

As used herein, the groove of a transverse grooved member may be a groove that does not extend entirely through the thickness of the member, or, in embodiments such as depicted in FIGS. 1-7 above, the groove is comprised of a slot that extends entirely through the thickness of the member. The latter form of a groove is believed to have superior reliability, as it allows a larger portion of a protruding force-transfer post (such as a cam follower) to engage with and transfer force to the transverse grooved member. Thus, it is appreciated that the groove in the transverse grooved member (one example of which is the transverse actuation bar (10) of FIGS. 1-7) can be formed entirely through the thickness of the member (as a slot), or it may enter only part way through such thickness.

Figure 8:
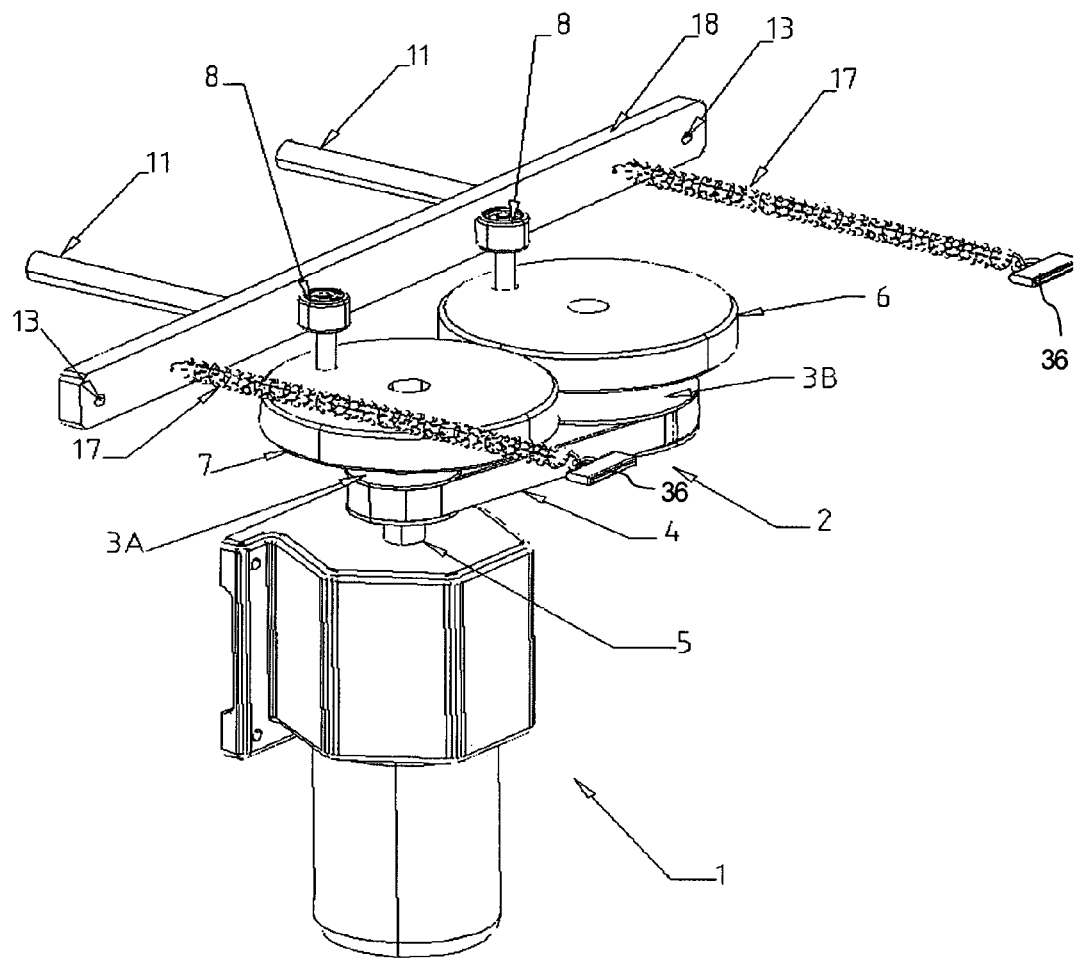
FIG. 8: A perspective view of an embodiment in which the transverse member does not have a groove in which force-transfer posts travel.
Figure 9:
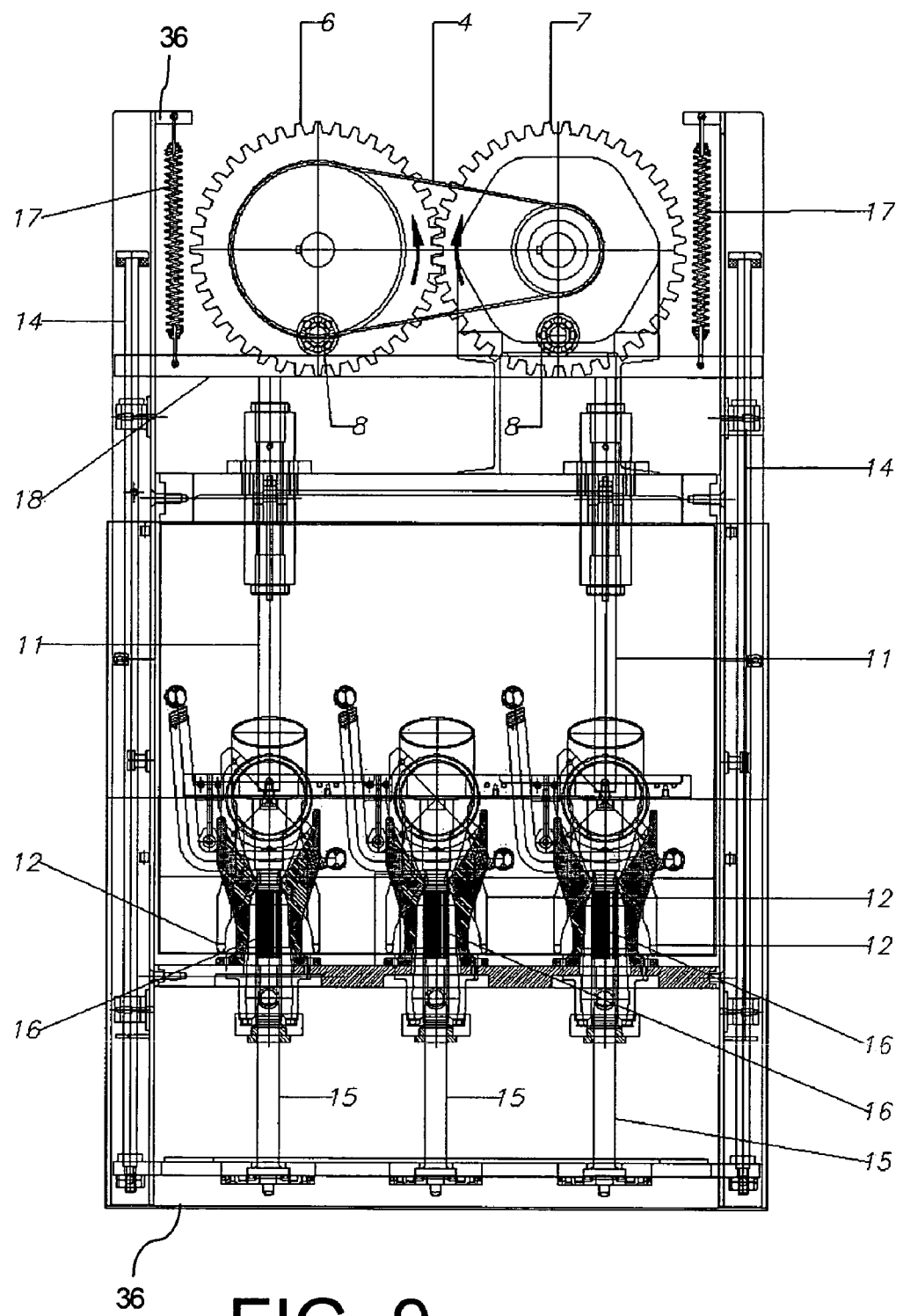
FIG. 9: An overhead view of the embodiment depicted in FIG. 8.

Also, it is noted that not all transverse members need have a groove in which the force-transfer posts slidingly engage. For example, referring to FIGS. 8 and 9, which provide perspective and overhead views of an embodiment of a multi-head juicing apparatus, a transverse member (18) receives force along one side, not in a groove, from the two cam followers (8), which are connected to two adjacent co-rotating members (6 and 7). Tension springs (17) (one end of each being attached to a part of a chassis (36)) provide force for the return stroke of the linear back and forth motion of the transverse member (18), and, consequently, other moveable components attached thereto via drive rods (11). In other embodiments, compression rather than tension springs may be utilized. Other numbered components in FIGS. 8 and 9 function similarly to similarly numbered components as previously described with regard to FIGS. 1-7. Also, as for the discussion of a transverse grooved member, a transverse member that does not have a groove may be configured to communicate directly with a set of peeler cups, rather than through one or more drive rods or other connecting means. For example, not to be limiting, a transverse member may be directly attached to each peeler cup of a first set of moveable peeler cups.

Embodiments of the present invention include embodiments in which there are two co-rotating members that rotate in opposing directions, such as depicted in the co-rotating gear members of FIGS. 1-7. As discussed above, it is appreciated that such coordinated counter-rotating motion tends to provide a more balanced set of forces on the transverse grooved member. However, this is not meant to be limiting. Two co-rotating members may rotate in the same direction. In such embodiments they would not be directly connected by meshing gear teeth along their respective perimeters, but would be driven by other means. For instance, and not to be limiting, a single gear may be disposed between two co-rotating gear members, transferring rotational force from one driving co-rotating gear to a second driven co-rotating gear, and resulting in rotation of these two rotating gear members in the same direction. While such non-opposing motion may require stronger and/or longer bushings or other means to counter a tendency for sideways motion (i.e., bushings in lateral guide orifices or the like), such embodiments fall within the scope of the present invention.

In addition to the drive transfer approaches described above, it is appreciated that any of a range of other approaches to providing synchronized rotation of the co-rotating members may be utilized. For example, not to be limiting, chains, belts, slotted or grooved belts, direct motor drive, a geared step-down transmission, a geared step-up transmission, a single gear directly driving two co-rotating members (i.e., disposed between them), and so forth may be employed. Collectively, all such means are considered and referred to herein as "means for transmitting," and "means for transmitting rotating motion," and are among the known available alternatives for the step of transmitting rotating motion in methods of the present invention. Based on the use of the force-transfer posts of the co-rotating members to slidingly engage (via the groove) the transverse grooved member to convert circular to reciprocating linear motion, it is further appreciated that the initial alignment of the force transfer posts must be properly aligned to consistently provide a synchronized, smooth conversion of such motion, and the drive mechanism utilized to rotate the co-rotating members must be selected so as to maintain this coordinated positioning for extended periods of operation. In part for these reasons the use of meshing gears is provided as the example in FIGS. 1-7.

Likewise, any power source may provide a rotating energy to drive the mechanism, and there may be employed any type of direct connection, or reduction or magnification of rotational speed, as are known to those skilled in the art. For example, not to be limiting, a power source may be a direct drive electric motor, an electric motor with a geared transmission to decrease or increase the revolutions per minute, a hydraulic drive unit (e.g., from a hydraulic power plant), a pneumatic drive unit (e.g., from a pneumatic power plant), and a non-electric motor mechanical source of rotational power (such as from a kinetic-based source, e.g., water power, wind power, and the like). Collectively, these are considered to be included in the term "means for powering," and are among the known available alternatives for the step of powering in methods of the present invention.

The assemblage of opposing matched peeler cups, including their respective filtering devices and plungers, collectively are termed, and fall within the general term "means for extracting," and such assemblage is one of various known types of a "fruit juice extraction assembly." The above examples are not meant to be limiting as to the variety and scope of alternative configurations of a "means for extracting," and other embodiments, such as obtainable by combination of features described in references incorporated by reference herein, and/or including later-developed components, are meant to be included in the scope of the term "means for extracting."

Also, it is appreciated that any number of and arrangements of connectors may be utilized to connect the transverse grooved member to any one of the moveable components of the juice extraction machine. For example, not to be limiting, one or more rods, bars, beams, pipes, or connecting arms may be utilized for such connecting. When connecting the transverse grooved member to one or more of the peeler cups, these elements are termed "primary connecting elements," also are included in the term "means for connecting," and are among the known available alternatives for the step of connecting in methods of the present invention. For elements connecting to one or more plungers, either directly from the transverse grooved member or indirectly, such as from one or more primary connecting elements, these elements are termed "secondary connecting elements." For some embodiments, such elements also are included in the term "means for connecting," and are among the known available alternatives for the step of connecting in methods of the present invention. By use of secondary drive transfer elements, that may be connected directly or indirectly to the transverse grooved member, moveable components of a juice extraction machine are driven in a coordinated fashion to achieve a desired coordinated motion of respective moveable components (i.e., moveable peeler cups, plungers) for a repetitive (i.e., iterative) juicing cycle.

Accordingly, a fruit juicer of the present invention may be described as comprising:

a transverse grooved member having a groove extending transversely to an axis of movement, connected to drive in a back and forth reciprocating action along said axis at least one of two opposing sets of mating peeler cups;

a first co-rotating member comprising a first protruding force-transfer post disposed to slidingly engage in the groove;

a second co-rotating member comprising a second protruding force-transfer post disposed to slidingly engage in the groove;

a means for powering in a rotating motion at least one of the first co-rotating member and the second co-rotating member;

a means for extracting juice from articles of fruit; and a means for connecting the transverse grooved member to the means for extracting juice.

In some embodiments, the second co-rotating member is adapted to rotate in an opposite direction of the first co-rotating member. In some embodiments, the above-described fruit juicer may additionally comprise a means for transmitting between the means for powering and the at least one of the first co-rotating member and the second co-rotating member. Also, in some embodiments, the means for connecting comprises both primary connecting elements and secondary connecting elements engaged to provide coordinated reciprocation of moveable peeler cups and plungers.

Accordingly, while embodiments of the present invention have been shown and described herein in the present context, such embodiments are provided by way of example only, and not of limitation. Numerous variations, changes and substitutions will occur to those of skilled in the art without departing from the invention herein. For example, the present invention need not be limited to best mode disclosed herein, since other applications can equally benefit from the teachings of the present invention. Accordingly, it is intended that the invention be limited only by the spirit and scope of the appended claims.

What is claimed is:

1. A fruit juicer comprising:

a plurality of fixed peeler cups each comprising a filtering device;

a plurality of movable peeler cups affixed along a longitudinal length of a transverse plate and movable axially toward and away from the fixed peeler cups;

a transverse actuation bar comprising a longitudinally oriented groove and comprising an axially oriented guide orifice at each opposed longitudinal end of the transverse actuation bar, a longitudinal axis of the longitudinally oriented groove being perpendicular to respective axial opening axes of the axially oriented guide orifices;

a pair of drive rods interconnecting the transverse actuation bar and the transverse plate;

a pair of lateral rods each comprising a first end passing through a respective one of the axially oriented guide orifices and a second end extending axially past the fixed peeler cups;

a transverse member interconnecting the second ends of the respective lateral rods;

a plurality of plungers extending from the transverse member, each plunger aligned with a respective one of the filtering devices;

a power source comprising a rotating member having a protruding force-tranfer post extending into the longitudinally oriented groove in the transverse actuation bar such that rotation of the rotating member causes reciprocating linear axial movement of the transverse actuation bar, the axially oriented guide orifices allowing sliding relative movement between the traverse actuation bar and the lateral rods;

movement of the transverse actuation bar toward the fixed peeler cups causing the movable peeler cups to move toward the fixed peeler cups to peel and squeeze a respective fruit there between, and movement of the transverse actuation bar away from the fixed peeler cups causing the moveable peeler cups to separate from the fixed peeler cups;

the longitudinal ends of the transverse actuation bar contacting a force receiving end of each respective lateral rod upon return movement of the transverse actuation bar away from the fixed peeler cups causing the plungers to move into the respective filtering device for expulsion of a fruit core therefrom simultaneously with the moveable peeler cups separating from the fixed peeler cups to enable the fruit core to pass between the respectively separated cups.

2. The fruit juicer of claim 1, the power source further comprising a pair of counter-rotating members each comprising a respective protruding force-transfer post extending into the longitudinally oriented groove in the transverse actuation bar.

\* \* \* \* \*